US012504719B2

(12) United States Patent
Mertenat et al.

(10) Patent No.: US 12,504,719 B2
(45) Date of Patent: Dec. 23, 2025

(54) BALANCE-SPRING STUD HOLDER DEVICE

(71) Applicant: ETA SA Manufacture Horlogère Suisse, Grenchen (CH)

(72) Inventors: Olivier Mertenat, Grenchen (CH); Jean-Luc Helfer, Le Landeron (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 317 days.

(21) Appl. No.: 18/337,162

(22) Filed: Jun. 19, 2023

(65) Prior Publication Data

US 2023/0408979 A1 Dec. 21, 2023

(30) Foreign Application Priority Data

Jun. 21, 2022 (EP) .................................... 22180223

(51) Int. Cl.
*G04B 17/34* (2006.01)

(52) U.S. Cl.
CPC .................................... *G04B 17/34* (2013.01)

(58) Field of Classification Search
CPC ...... G04B 17/34; G04B 17/325; G04B 18/06; G04B 17/32; G04B 17/063; G04B 17/345; G04B 13/021; G04B 17/06
See application file for complete search history.

(56) References Cited

U.S. PATENT DOCUMENTS 9,250,610 B2 * 2/2016 Daout .................. G04B 17/345
10,444,707 B2 * 10/2019 Hernandez ............. G04B 17/06
12,038,722 B2 * 7/2024 Hernandez ........... G04B 17/063

FOREIGN PATENT DOCUMENTS

CH 712 854 A1 3/2018
EP 1 798 609 A2 6/2007
EP 1 798 609 A3 6/2007
FR 2 368 070 A1 5/1978

OTHER PUBLICATIONS

European Search Report issued Oct. 21, 2022 in European Application 22180223.4 filed on Jun. 21, 2022 citing documents 15-18 therein 3 pages (with English Translation of Categories of Cited Documents).

* cited by examiner

*Primary Examiner* — Edwin A. Leon
(74) *Attorney, Agent, or Firm* — Oblon, McClelland, Maier & Neustadt, L.L.P.

(57) ABSTRACT

A balance-spring stud holder includes a clamping part defining three contact zones intended to press against a lateral wall of a projecting part of the balance bridge, a first contact zone being connected to a second contact zone by a first part and to the third contact zone by a second part of the clamping part. The first part has a first stiffness at a second median point of the second contact zone, relative to a first median point of the first contact zone, which is greater than three times a second stiffness that the second part has at a third median point of the third contact zone relative to the first median point of the first contact zone. The first stiffness can be seven times greater than the second stiffness.

13 Claims, 4 Drawing Sheets

BALANCE-SPRING STUD HOLDER DEVICE

CROSS-REFERENCE TO RELATED APPLICATION

This application claims priority to European Patent Application No. 22180223.4 filed on Jun. 21, 2022, the entire disclosure of which is hereby incorporated herein by reference.

TECHNICAL FIELD OF THE INVENTION

The invention relates to a balance-spring stud holder device incorporated in a timepiece movement, more precisely arranged on a balance bridge.

TECHNOLOGICAL BACKGROUND

From the document FR 2368070, a balance-spring stud holder device is known, which is mounted with friction on a shoulder (projecting cylindrical portion) that the balance bridge includes or on a support of a shock-resistant bearing provided for the balance. This balance-spring stud holder comprises a circular split ring that comprises two symmetrical arms having a certain elasticity to allow the friction mounting of the balance-spring stud holder on the balance bridge. The interior circle of the split ring is designed with a diameter a little smaller than that of the chimney or of the circular part of the support of the shock-resistant bearing intended to receive the balance-spring stud holder, so that the two elastic arms separate a little during assembly to provide a certain amount of clamping and to obtain the required friction. As the interior circle therefore has a diameter less than the part on which it is mounted, the balance-spring stud holder during assembly undergoes a small movement along the axis passing through the centre of said circle and the middle of the opening between the elastic arms, in the direction opposite to that of this opening from said centre. In general, as shown in this document, the part of the balance-spring stud holder on which the balance-spring stud is attached is arranged on said axis opposite the opening of the split ring. Thus the distance between the axis of the balance spring stud and the centre of the interior circle of the split ring varies when the balance-spring stud holder is mounted on the balance bridge. In fact this distance increases, which poses a problem for the precision of the point of attachment of the balance spring to the balance bridge. It will be noted that this problem remains whatever the angular position of the part to which the balance-spring stud is attached relative to the centre of the split ring. This is because, in all cases, this part where the balance spring is attached is subject to the translation of a part of the split ring diametrically opposite to its opening, which takes place along said axis passing through the centre of this opening when the balance-spring stud holder is friction mounted on the balance bridge.

The document CH 604226 discloses a balance-spring stud holder configured to be bayonet-mounted on a part of the balance bridge and held in a given angular position by friction of the ring forming the balance-spring stud holder on this part. More particularly, the part of the balance bridge in question is a piece encased in a hole in the plate of the balance bridge and projecting above this plate. This piece is arranged to receive a bearing of the balance. The ring has an interior flat that, following a rotation of the balance-spring stud holder to close the bayonet system, provides a three-point clamping of a lateral wall of the aforementioned piece by this ring to maintain an angular positioning by friction of the ring. During the clamping rotation, the flat on the ring undergoes a movement relative to the initial centre of this ring, which causes the same problem as the one highlighted previously in the document FR 2368070. This is because the area where the balance-spring stud is attached undergoes a small movement in the plane of the balance-spring stud holder during a rotation of the balance-spring stud holder relative to the central axis of the encased piece, which defines the rotation axis of the balance, to close the bayonet system and obtain clamping.

The document EP 1798609 also discloses a balance-spring stud holder forming a bayonet system with a projecting part of the balance bridge, as shown at FIG. 2 of this document. The balance-spring stud holder is distinguished by three protrusions that are located inside the ring surrounding the projecting part and which form the bayonet system. These three protrusions participate in the bayonet system by, in a first step, enabling the balance-spring stud holder to be fitted freely at the correct level around the projecting part and then to close the bayonet system by being inserted by a rotation of the balance-spring stud holder in three respective lateral grooves machined in the projecting part. Tight friction is provided to prevent the balance-spring stud holder having clearance relative to the projecting part. However, no teaching is given as to the elasticity of the two parts of the balance-spring stud holder between the central protrusion and the two end protrusions having an opening between them. In fact, the elasticity of these two parts may be small and the friction provided may also be small since the friction serves only to prevent a clearance, but serves neither for the axial holding of the balance-spring stud holder, which is obtained by the bayonet system, nor for the angular positioning of the balance-spring stud holder since this angular positioning is achieved by a swan-neck return spring and a micrometric screw. It will be noted that, in the teaching given in the document EP 1798609, nothing makes it possible to think or conclude that one of the two parts of the balance-spring stud holder surrounding the projecting piece has elasticity different from the other.

SUMMARY OF THE INVENTION

The aim of the invention is to provide a balance-spring stud holder that does not exhibit the drawbacks of the balance-spring stud holders of the prior art that are mentioned above. In particular, the objective of the invention is to provide a balance-spring stud holder making it possible to obtain a very precise positioning of the balance-spring stud in the general plane of the balance-spring stud holder, in particular a very precise and predetermined radial positioning relative to the rotation axis of the balance spring.

For this purpose, the invention relates to a balance-spring stud holder intended to be mounted on a balance bridge of a timepiece mechanical movement and comprising a part for attaching a balance-spring stud and a clamping part that is designed to be able to clamp a lateral wall of a projecting part of the balance bridge or of a piece mounted on this balance bridge. The clamping part defines three contact zones intended, once the balance-spring stud holder is mounted on the balance bridge, to press against the lateral wall of the projecting part or piece, a first contact zone from the three contact zones being connected to a second contact zone from these three contact zones, which is adjacent to the first contact zone, by a first part of the clamping part, which has, between the first and second contact zones, a first separation zone, and to the third contact zone from the three contact zones, which is also adjacent to the first contact zone, by a second part of the clamping part that has, between the first and third contact zones, a second separation zone. The first and second separation zones are provided, once the balance-spring stud holder is mounted on the balance bridge, recessed from the lateral wall of the projecting part or piece. In a general plane in which the clamping part extends overall, the first part has a first stiffness at a second median point of the second contact zone, relative to a first median point of the first contact zone, which is greater than three times a second stiffness that the second part has at a third median point of the third contact zone relative to the first median point of the first contact zone.

In an advantageous variant, the first stiffness is greater than seven times the second stiffness. In a preferred variant, the first stiffness is greater than twelve times the second stiffness.

In a main embodiment, in said general plane, the first part is rigid and the second part is elastic.

The object of the invention, so as to unequivocally characterise the stiffnesses of said first part and of said second part, is characterised hereinabove by relative values for the stiffnesses of these first and second parts in three contemplated variants. Thus any possible problem related to the clarity of the terms "rigid" and "elastic" is solved. However, in a main embodiment, it can be said that, in said general plane, the first part is rigid (almost without deformation) and the second part is elastic/flexible. This is because, the more rigid the first part, i.e. substantially without deformation when the balance-spring stud holder is mounted on the balance bridge, the more precise will be the centring of the balance-spring stud holder provided by the invention and thus the more precise will be the radial position of the balance-spring stud.

BRIEF DESCRIPTION OF THE FIGURES

The invention will be described in more detail hereinafter by means of the accompanying drawings, given by way of examples that are in no way limiting, in which.

DETAILED DESCRIPTION OF THE INVENTION

With reference to FIGS. 1A, 1B and 2A, 2B, two variants of a first embodiment of a balance-spring stud holder according to the invention will be described hereinafter.

Figure 1B:
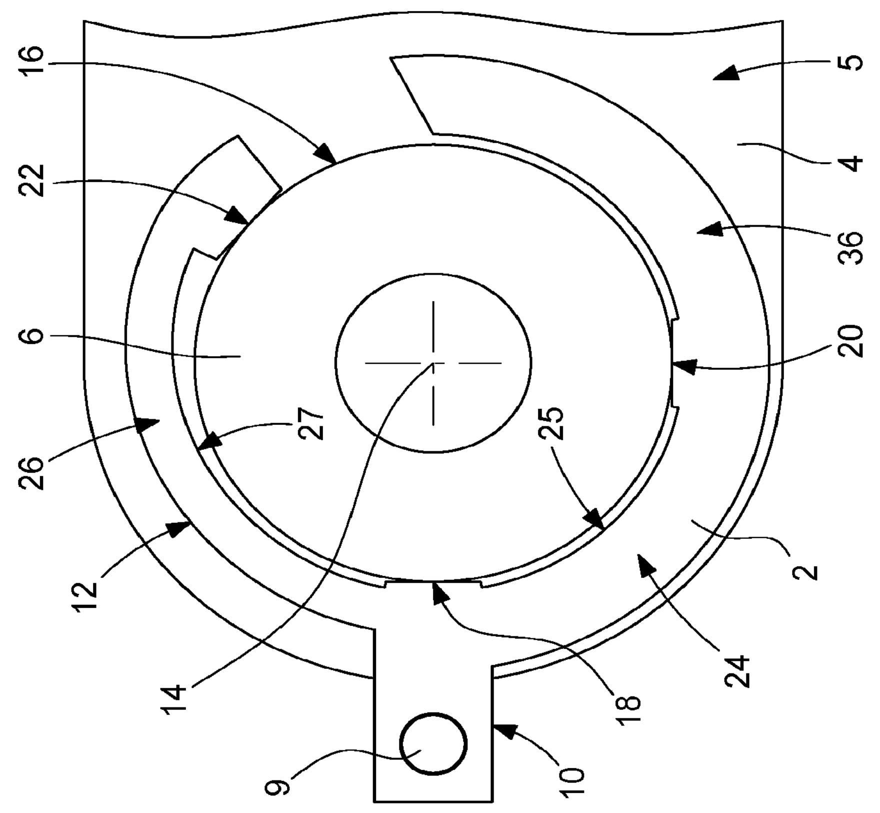
FIG. 1B is a plan view of this balance-spring stud holder mounted on a cylindrical part of a balance bridge.
Figure 1A:
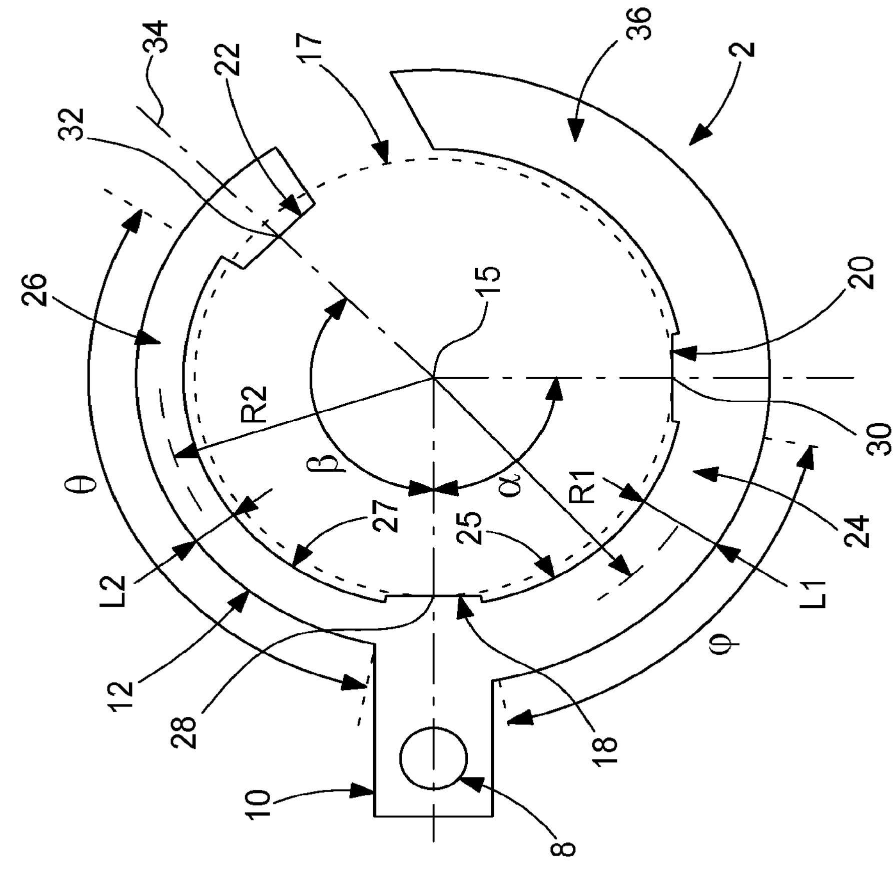
FIG. 1A is a plan view of a balance-spring stud holder according to a first variant of a first embodiment of the invention.

FIG. 1A shows a balance-spring stud holder 2, according to a first variant, before mounting thereof on a balance bridge, while FIG. 1B shows the balance-spring stud holder 2 once mounted on a balance bridge 4 intended to receive same. The balance spring 4 is conventionally provided in a mechanical timepiece movement equipped with a balance spring the balance of which is pivoted in a bearing (these elements have not been shown on the figures), this bearing being provided at the centre of a projecting part 6 of the balance bridge or of a piece mounted on this balance bridge, and the outer end of the spring of which is held by a balance-spring stud 9 that is attached, in a known manner, in particular by a lateral screw, in an opening 8 of an attachment part 10 of the balance-spring stud holder. It should be noted that the opening may be replaced in particular by a slot and that various variants can be contemplated by a person skilled in the art for attaching the balance-spring stud to the balance-spring stud holder.

The balance-spring stud holder comprises a clamping part 12 that is designed to be able to clamp a lateral wall 16 of the projecting part 6 or, in a variant, of a piece mounted on this balance bridge. This projecting part or piece has a cylindrical or slightly frustoconical part, the cylindrical or frustoconical external surface of which defines the lateral wall 16 and the central axis 14 of which defines the rotation axis of the balance. The aforementioned piece is in particular a piece of a regulator assembly, comprising the balance-spring stud holder in question, or a support of the bearing provided for the balance spring. When the balance-spring stud holder 2 is mounted on a frustoconical part, the circular cross section of this part increases on moving away from the plate 5 of the balance bridge 4. The expression "mounted on" does not mean that the piece is necessarily above the plate of the balance bridge relative to the space provided for the balance spring. This is because, in some embodiments, the balance-spring stud holder can be arranged below the plate of the balance bridge, on the balance spring side.

The clamping part 12 defines three contact zones 18, 20 and 22 intended, once the balance-spring stud holder is mounted on the balance bridge, to press against the lateral wall 16 of the projecting part 6 or piece. A first contact zone 18 from the three contact zones is connected to a second contact zone 20 from these three contact zones, which is adjacent to the first contact zone, by a first part 24 of the clamping part 12, which has, between the first and second contact zones, a first separation zone 25. The first contact zone 18 is also connected to a third contact zone 22 from the three contact zones, which is also adjacent to the first contact zone 18, by a second part 26 of the clamping part, which has, between the first and third contact zones, a second separation zone 27. The first and second separation zones 25 and 27 are provided, once the balance-spring stud holder 2 is mounted on the balance bridge 4, recessed from the lateral wall 16 of the projecting part or piece.

In a general variant, the first contact zone 18 and the second contact zone 20 are tangent, in a general plane in which the clamping part 12 extends overall, to a geometric circle 17 respectively at a first median point 28 of the first contact zone and at a second median point 30 of the second contact zone. In this general variant, the respective extents of the first and second contact zones are determined by the first and second points of contact to the geometric circle 17 that is tangent to the first and second contact zones at these first and second points of contact, which define respectively the first and second median points.

In the various embodiments shown in the figures, the three contact zones are planar. Advantageously, at least the first and second contact zones 18, 20 are planar and, in the general plane in which the clamping part extends overall, orthogonal respectively to the two radii, from the centre 15 of the geometric circle 17, that pass respectively through the first and second median points 28, 30. Other variants are possible. In a particular variant, the first and second contact zones are concave, in an arc of a circle with the same radius and the same centre as the geometric circle 17. In another particular variant, the contact zones are provided slightly convex, for example in an arc of a circle with the same radius as that of said geometric circle.

In the first variant in FIGS. 1A and 1B, the first part 24 forms, in the first separation zone 25, a first circular arm with a rectangular cross-section with a width L1 and a mean radius R1 from the centre 15 of the geometric circle 17. The first separation zone 25 extends over a first angular distance φ. The second part 26 forms, in the second separation zone 27, a second circular arm with a rectangular cross-section with a width L2 and a mean radius R2 from the centre 15 of the geometric circle 17. The second separation zone 27 extends over a second angular distance θ.

According to the invention, in the general plane in which the clamping part 12 extends overall, the first part 24 has a first stiffness K1 at the second median point 30 of the second contact zone 20, relative to the first median point 28 of the first contact zone 18, which is greater than three times a second stiffness K2 that the second part 26 has at a third median point 32 of the third contact zone 22 relative to the first median point 28 of the first contact zone, i.e. $K1>3\cdot K2$. It should be noted that the stiffness in question is a flexural stiffness and that the elastic constant of the first part and respectively of the second part is defined by the inverse of its flexural stiffness.

According to an advantageous variant, the first stiffness K1 is greater than seven times the second stiffness K2, i.e. $K1>7\cdot K2$.

According to a preferred variant, the first stiffness K1 is greater than twelve times the second stiffness K2, i.e. $K1>12\cdot K2$.

In the example shown in FIGS. 1A and 1B, the width $L2=0.55\cdot L1$, the first angle $\varphi=68°$ and the second angle $\theta=110°$. According to the laws of physics, the flexural stiffness K varies with the width L to the power of three, i.e. $K\sim L^3$, of the part in question (here a circular arm) and also with the length thereof to the power of three, i.e. $K\sim(R\cdot\psi)^3$ with R the mean radius of the circular arm and iv the angular distance of this circular arm. Considering as a first approximation only the two circular arms located in the two separation zones 25 27, then $K1=K2\cdot(1.5)^3\cdot(1.8)^3$, is then obtained, i.e. $K1=20\cdot K2$ approximately. Thus the first stiffness K1 is approximately twenty times greater than the second stiffness K2. Consequently, in the example shown, the elasticity of the second part 26, more specifically of the second separation zone 27, is approximately twenty times greater than the elasticity of the first part 24, more specifically of the first separation zone 25.

In the two variants of the first embodiment, the third median point 32 of the third contact zone 22 is substantially coincident, in the general plane in which the clamping part 12 extends overall, with a straight line 34 bisecting a first angle α defined by the first and second median points 28 and 30 from the centre 15 of the geometric circle 17 tangent to the first and second contact zones 18 and 20. It should be noted that the adverb "substantially" indicates in particular that this may be the situation provided before or after the mounting of the balance-spring stud 2 on the balance bridge 4. In the first variant, the first angle α is substantially equal to ninety degrees (90°), the third median point 32 then having a second angle β in relation to the first median point 28, from the centre 15 of the geometric circle 17, substantially equal to one hundred and thirty-five degrees (135°).

By virtue of the characteristics of the balance-spring stud holder 2 according to the invention, it is possible to mount the balance-spring stud holder on the projecting part 6 of the balance bridge while ensuring a very precise radial positioning of the opening 8, and thus of the balance-spring stud 9, in relation to the central axis 14 of the projecting part that is coincident with the oscillation axis of the balance spring. In addition, a precise positioning in a general plane of the balance-spring stud holder, which is perpendicular to the rotation axis 14 of the balance, is obtained by means of the two contact zones 18 and 20, which have between them an angular offset advantageously of between 60° and 120°, preferably 90°. This is because the first part 24, connecting the two contact zones 18 and 20, is provided with great rigidity relative to the second part 26, connecting the two contact zones 18 and 22, which has sufficient elasticity for, during a separation of the two parts 24 and 26, essentially only the contact zone 22 to undergo a movement in the general plane of the balance-spring stud holder in relation to the contact zone 18. A first rigid part 24 and a second elastic part 26 can therefore be spoken of. It should be noted that the contact zone 22 is provided, before the balance-spring stud holder is mounted on the balance bridge, inside the geometric circle 17 that is tangent to the two contact zones 18 and 20. Thus, during mounting, substantially only the second elastic part undergoes elastic deformation and it is the first and second contact zones 18 and 20 that provide the precise radial positioning of the balance-spring stud 9 and also the precise positioning thereof in the general plane of the balance-spring stud holder once the balance-spring stud holder has been angularly positioned on the projecting part 6, given that the attachment part 10 of the balance-spring stud is rigidly connected to the first rigid part of the clamping part 12. This is because, as the first part 24 is rigid, the centre 15 of the geometric circle 17 is coincident with the central axis 14 of the projecting part 6 after the balance-spring stud holder is mounted on the balance bridge, given that the radius of the geometric circle 17, tangent to the contact zones 18 and 20, is provided equal to the radius of the projecting part 6 in the general plane in question, within the machining tolerances of the balance-spring stud holder and of the projecting part, tolerances that a person skilled in the art will make as small as possible for the machining technologies provided.

The balance-spring stud holder 2 also comprises a free part 36 that extends the first part 24 beyond the second contact zone 20. This free part has several functions, namely a safety function for preventing an impact being able to laterally demount the balance-spring stud holder, a mounting function for enabling a specific tool to momentarily move the third contact zone 22 away from the centre 15, and an aesthetic function.

Figure 2B:
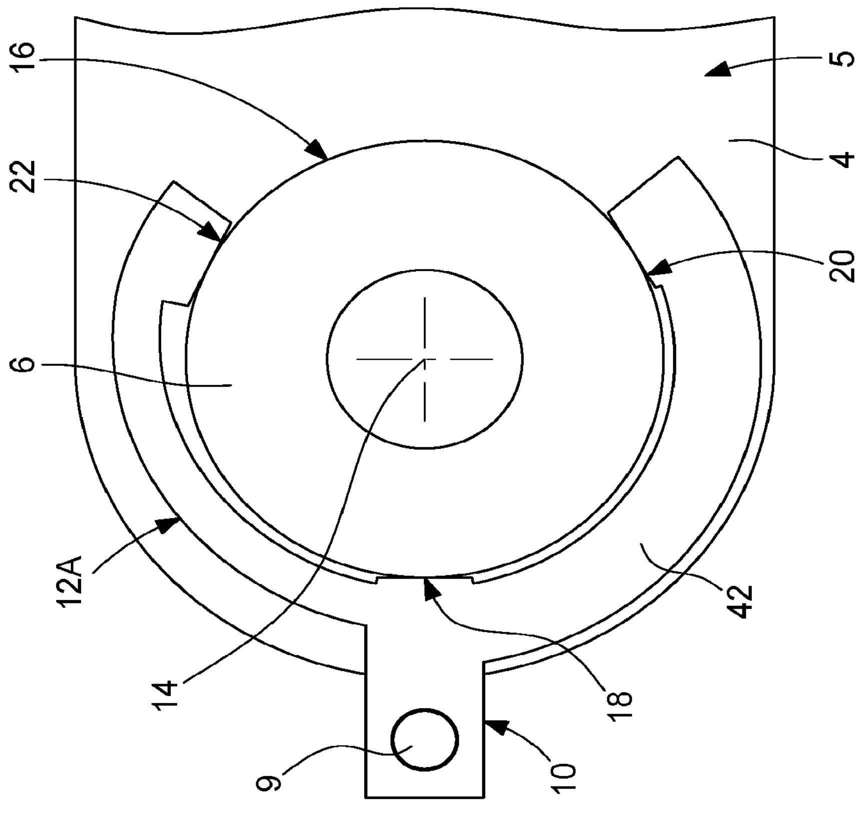
FIG. 2B is a plan view of this balance-spring stud holder mounted on a cylindrical part of a balance bridge.
Figure 2A:
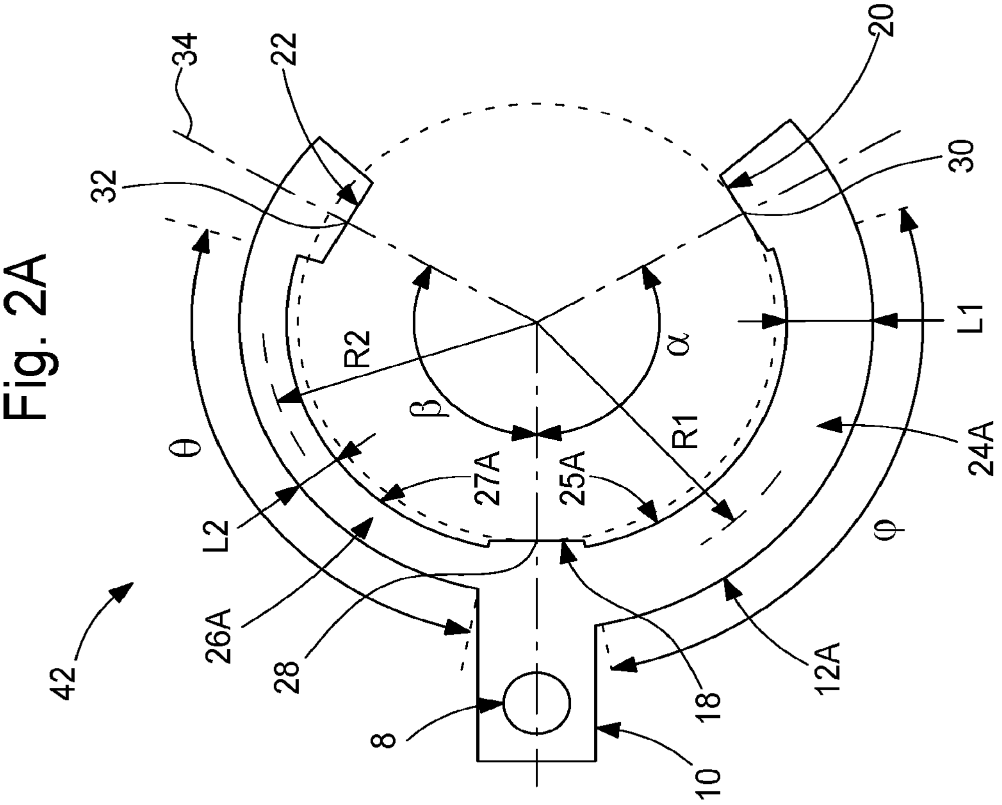
FIG. 2A is a plan view of a balance-spring stud holder according to a second variant of a first embodiment of the invention.

FIGS. 2A and 2B relate to a second variant of the first embodiment that is distinguished from this first embodiment essentially by the fact that the first angle α and the second angle β are equal and are each equal to one hundred and twenty degrees (120°). In this case, the first angle φ (also called the first angular distance) is substantially equal to the second angle θ (also called the second angular distance). The various parts of the balance-spring stud holder 42, which comprises a clamping part 12A with a first part 24A, connecting the contact zones 18 and 20 and defining a first separation zone 25A, and a second part 26A connecting the contact zones 18 and 22 and defining a second separation zone 27A, will not be described again in detail. It will be observed that the balance-spring stud holder 42 does not comprise the additional free part.

A calculation on the basis of the example shown in FIGS. 2A and 2B gives the following result: The first stiffness K1 of the first part 24A, more specifically of the first separation zone 25A, is approximately five times greater than the second stiffness K2 of the second part 26A, more specifically of the second separation zone 27A. Consequently, in the example shown, the elasticity of the second part 26A, more specifically of the second separation zone 27A, is approximately five times greater than the elasticity of the first part 24A, more specifically of the first separation zone 25A. It should be noted that this value varies fairly greatly with a relatively small variation in the ratio of the widths L1 and L2. Generally, the ratio between the first stiffness K1 and the second stiffness K2 is provided greater than three. Advantageously, this ratio is provided greater than seven, which can easily be obtained with the second variant. Preferably, the ratio K1/K2 is provided greater than twelve.

Figure 3B:
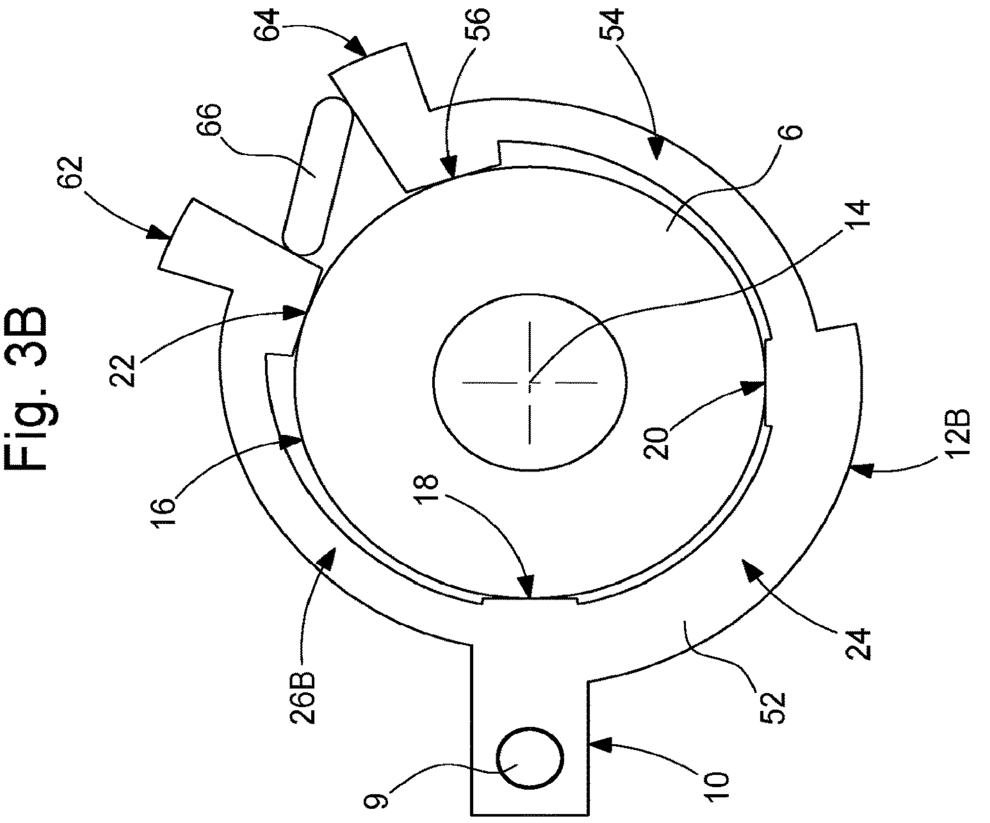
FIG. 3B is a plan view of this balance-spring stud holder mounted on a cylindrical part of a balance bridge.
Figure 3A:
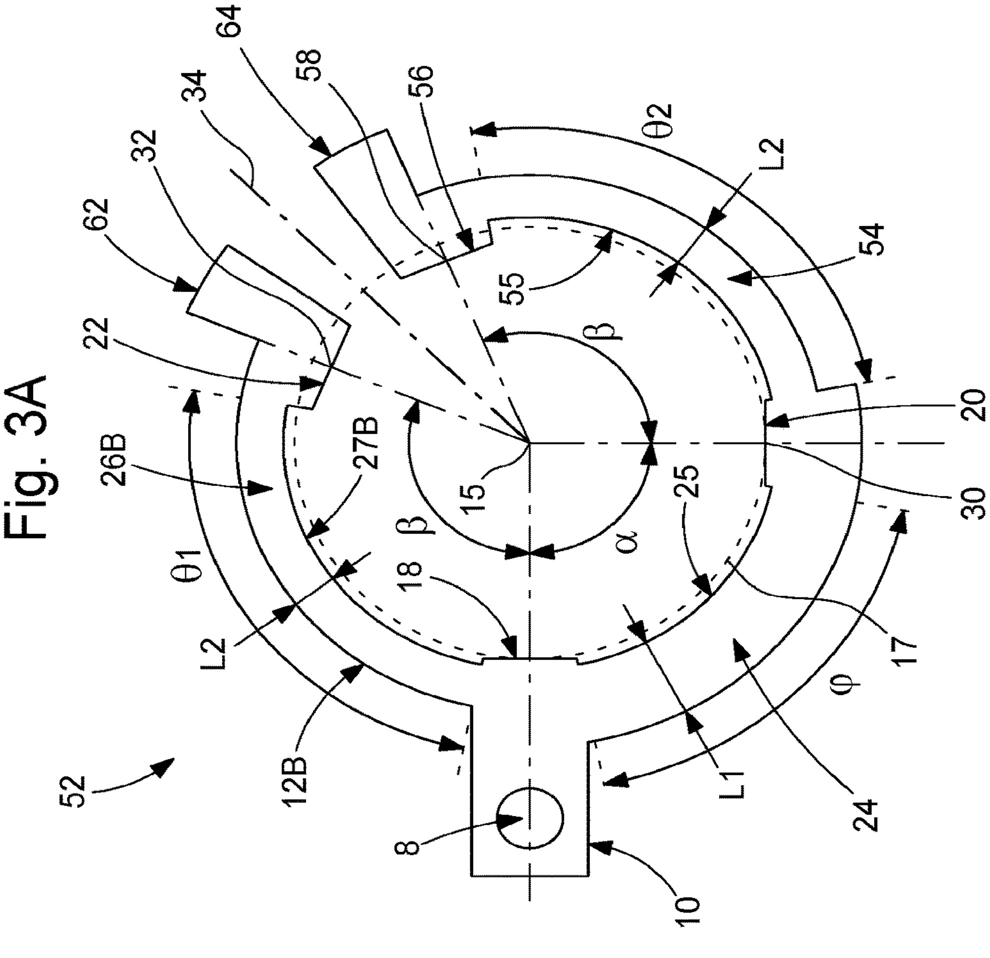
FIG. 3A is a plan view of a balance-spring stud holder according to a second embodiment of the invention.

FIGS. 3A and 3B show a second embodiment of a balance-spring stud holder according to the invention. The parts of the balance-spring stud holder 52 that are identical or similar to those of the first embodiment and which have already been described previously will not be described again here in detail. Reference should therefore be made to the description of the first embodiment for these identical or similar parts. It should be noted that the letter "B" appended to a number in a reference indicates that it is a case of a part similar to the one bearing this number as a reference in the first embodiment.

The balance-spring stud holder 52 comprises an attachment part for a balance-spring stud 9, this attachment part being secured to the first part 24 of the clamping part 12B. In particular, the attachment part 10 is rigid and rigidly attached to the first part 24. "Rigidly attached" is not understood to mean that these two parts must initially be separate pieces that are attached to each other, but it is understood that the attachment part and the first part form together a rigid part of the balance-spring stud holder, this rigid part defining first and second contact zones 18 and 20 having between them a separation zone, which extends over a certain non-zero angular distance, advantageously between 60° and 120°, preferably substantially equal to 90°. The clamping part 12B also comprises a second part 26B connecting the first contact zone 18 to the third contact zone 22. Furthermore, the clamping part defines a fourth contact zone 56 that is intended, once the balance-spring stud holder 52 is mounted on the balance bridge, to press against the lateral wall 16 of the projecting part 6 of the balance bridge (not shown) or of a part attached to this balance bridge. This fourth contact zone 56 is adjacent to the second contact zone 20 and connected to this second contact zone by a third part 54 of the clamping part 12B, which has between the second and fourth contact zones a third separation zone 55. The third part 54 has a third stiffness K3 at a fourth median point 58 of the fourth contact zone, relative to the second median point 30 of the second contact zone, which is less than one third of the first stiffness K3 of the first part 24. In a preferred variant, the first stiffness K1 is greater than seven times the third stiffness K3, i.e. K1>7·K2. Thus, like the second part, the third part 54 is elastic.

The doubling of the second elastic part with the third elastic part increases the total clamping force of the balance-spring stud holder on the projecting part 6. The value of the width L2 of the separation zones defined by the second and third parts 26B and 54 can be selected for determining the elasticity of these two parts. Like the third contact zone 22, the fourth contact zone 56 is located inside the geometric circle 17 that is tangent to the first and second contact zones 18 and 20 at their median points, before the balance-spring stud holder is mounted on the balance bridge. To determine the total clamping force, the radial distance of the contact zones 22 and 56 for the balance-spring stud holder not mounted on the balance bridge can also be selected.

In the variant shown, the third and fourth contact zones 22, 56 have, in a general plane of the clamping part 12B, an axial symmetry relative to a straight line 34 bisecting the first angle α defined by the angular offset between the first contact zone 18 and the second contact zone 20 from the centre 15 of the geometric circle 17. More particularly, the second part 26B and the third part 54 are arranged symmetrically with respect to the bisecting straight line 34, so that the angular distance 81 of the second separation zone 27B is equal to the angular distance 82 of the third separation zone 55 defined by the third part 54. Thus the second part 26B and the third part 54 of the clamping part 12B have axial symmetry relative to the bisecting straight line 34.

The second and third parts 26B and 54 have at the respective free ends thereof two parts 62 and 64 that extend radially and are provided for facilitating the mounting of the balance-spring stud holder 52, around the projecting part 6 of the balance bridge, by means of a tool 66.

Figure 4B:
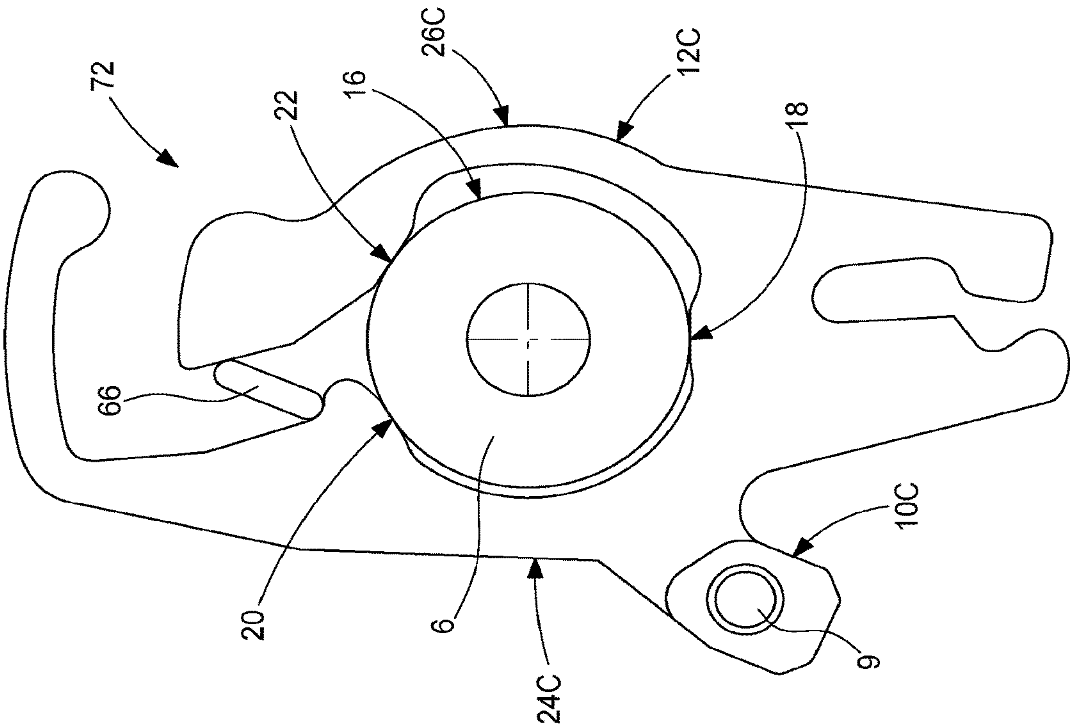
FIG. 4B is a plan view of this balance-spring stud holder mounted on a cylindrical part of a balance bridge.
Figure 4A:
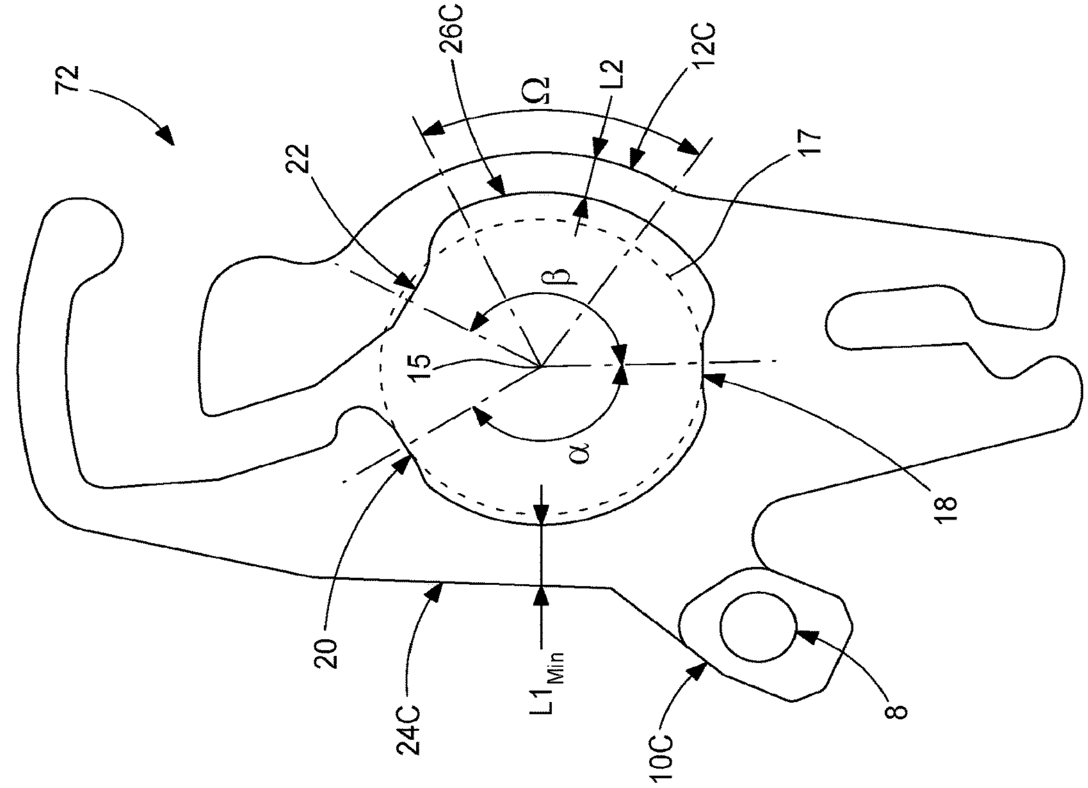
FIG. 4A is a plan view of a balance-spring stud holder according to a third embodiment of the invention.

FIGS. 4A and 4B show a third embodiment of the invention. The balance-spring stud holder 72 has a much more complex shape than the balance-spring stud holders shown in the other figures. This balance-spring stud holder 72 serves for several functions, which explains especially its particular shape. The balance-spring stud holder 72 comprises an attachment part 10C provided for attaching a balance-spring stud 9 and a clamping part 12C forming overall an open ring. As in the previous embodiments, the clamping part or open ring is elastic not uniformly or over almost the whole of its angular extent, but through the presence of at least one elastic part. The clamping part 12C comprises a first rigid part 24C, connecting the first and second contact zones 18 and 20, and a second elastic part 26C connecting the first and second contact zones 18 and 22. The first and second contact zones define an angle α between their respective median points, and the first and third contact zones define an angle β between their respective median points which is, in the example shown, substantially equal to the angle α. It should be noted that the angles α and β have a value greater than 120° and approximately equal to 150°. This variant is therefore not preferred with regard to the benefits of the invention. However, as the first rigid part 24C has a high stiffness that is very much greater than the stiffness of the second elastic part 26C, in particular more than twelve times greater, the angle α, greater than 120° and equal to 150°, allows precise positioning of the attachment part 10C, rigidly associated with the first part 24C, and therefore of the balance-spring stud 9 in the general plane of the balance-spring stud holder once the latter is mounted on the balance bridge (not shown).

The first part 24C has a minimum width $L1_{Min}$ at a single point, whereas the second part 26C has a circular arm with a width L2, less than $L1_{Min}$ and substantially equal to two thirds of $L1_{Min}$, this circular arm extending over an angle Ω that is greater than 60°. Thus substantially only the second part 26C undergoes an elastic deformation when the balance-spring stud holder 72 is mounted around the projecting part 6 of the balance bridge. This mounting is implemented by means of a tool 66 that is inserted in an opening between the first and second parts of the clamping part 12C and makes it possible to separate the respective free ends thereof.

The invention claimed is:

1. A balance-spring stud holder intended to be mounted on a balance bridge of a timepiece mechanical movement and comprising a part for attaching a balance-spring stud and a clamping part that is designed to be able to clamp a lateral wall of a projecting part of the balance bridge or of a piece mounted on this balance bridge; wherein the clamping part defines three contact zones intended, once the balance-spring stud holder is mounted on the balance bridge, to press against the lateral wall of the projecting part or piece, a first contact zone from the three contact zones being connected to a second contact zone from these three contact zones, the second contact zone is adjacent to the first contact zone, by a first part of the clamping part, and the clamping part has, between the first and second contact zones, a first separation zone, and to a third contact zone from the three contact zones, the third contact zone is also adjacent to the first contact zone, by a second part of the clamping part that has, between the first and third contact zones, a second separation zone, the first and second separation zones being provided, once the balance-spring stud holder is mounted on the balance bridge, recessed from the lateral wall of the projecting part or piece; and wherein, in a general plane in which the clamping part extends overall, the first part has a first stiffness at a second median point of said second contact zone, relative to a first median point of said first contact zone, the first stiffness is greater than three times a second stiffness that said second part has at a third median point of said third contact zone relative to the first median point of the first contact zone.

2. The balance-spring stud holder according to claim 1, wherein the first stiffness is greater than seven times the second stiffness.

3. The balance-spring stud holder according to claim 1, wherein the first stiffness is greater than twelve times the second stiffness.

4. The balance-spring stud holder according to claim 1, wherein, in said general plane, said first part is rigid and said second part is elastic.

5. The balance-spring stud holder according to claim 1, wherein the third median point of the third contact zone is substantially coincident, in a general plane in which the clamping part extends overall, with a straight line bisecting a first angle ($\alpha$) defined by the first and second median points from the centre of a geometric circle tangent to the first and second contact zones, at these first and second median points, or partially coincident with the first and second contact zones in the case where the latter are machined in an arc of a circle with the same radius and same centre as said geometric circle.

6. The balance-spring stud holder according to claim 5, wherein the first angle ($\alpha$) is substantially equal to ninety degrees (90°), the third median point then having a second angle ($\beta$) in relation to the first median point, from the centre of said geometric circle, substantially equal to one hundred and thirty-five degrees (135°).

7. The balance-spring stud holder according to claim 5, wherein the first angle and a second angle are each equal to one hundred and twenty degrees (120°).

8. The balance-spring stud holder according to claim 1, wherein the clamping part defines a fourth contact zone that is intended, once the balance-spring stud holder is mounted on the balance bridge, to press against the lateral wall of the projecting part or piece, this fourth contact zone being adjacent to the second contact zone and connected to this second contact zone by a third part of the clamping part, the clamping part has between the second and fourth contact zones a third separation zone; and wherein the third part has a third stiffness at a fourth median point of the fourth contact zone, relative to the second median point of the second contact zone, the third stiffness is less than one third of said first stiffness of the first part.

9. The balance-spring stud holder according to claim 8, wherein the first stiffness is greater than seven times the second stiffness and also greater than seven times the third stiffness.

10. The balance-spring stud holder according to claim 8, wherein the third and fourth contact zones have, in a general plane in which the clamping part extends overall, axial symmetry relative to a straight line bisecting a first angle ($\alpha$) defined by a first median point of the first contact zone and a second median point of the second contact zone from the centre of a geometric circle tangent to the first and second contact zones, at these first and second median points, or partially coincident with the first and second contact zones in the case where the latter are machined in an arc of a circle with the same radius and same centre as said geometric circle.

11. The balance-spring stud holder according to claim 10, wherein the second part and the third part of the clamping part have axial symmetry relative to said bisecting straight line.

12. The balance-spring stud holder according to claim 1, wherein the first and second contact zones are planar.

13. The balance-spring stud holder according to claim 5, wherein the first and second contact zones are planar.

* * * * *